(12) United States Patent
Miyoshi et al.

(10) Patent No.: US 7,085,470 B2
(45) Date of Patent: Aug. 1, 2006

(54) PLASTIC FIBER-OPTIC CABLE AND PRODUCING METHOD FOR THE SAME

(75) Inventors: Takahito Miyoshi, Shizuoka (JP); Toru Ogura, Shizuoka (JP); Yukio Shirokura, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 100 days.

(21) Appl. No.: 10/770,574

(22) Filed: Feb. 4, 2004

(65) Prior Publication Data

US 2004/0184757 A1      Sep. 23, 2004

(30) Foreign Application Priority Data

Feb. 5, 2003   (JP) .............................. 2003-028533

(51) Int. Cl.
  *G02B 6/00*   (2006.01)
  *G02B 6/44*   (2006.01)
  *G02B 6/02*   (2006.01)
  *G02B 6/16*   (2006.01)

(52) U.S. Cl. .................. 385/143; 385/141; 385/142; 385/144; 385/145; 385/100; 385/123; 385/124

(58) Field of Classification Search ................ 385/128, 385/116, 120, 100, 123, 124, 141–145
See application file for complete search history.

(56) References Cited

U.S. PATENT DOCUMENTS

| | | | | |
|---|---|---|---|---|
| 3,779,627 A | * | 12/1973 | Pinnow et al. ............... | 385/141 |
| 4,138,194 A | * | 2/1979 | Beasley et al. .............. | 385/143 |
| 4,173,393 A | * | 11/1979 | Maurer ....................... | 385/142 |
| 4,576,438 A | * | 3/1986 | Tatsukami et al. .......... | 385/143 |
| 4,758,067 A | * | 7/1988 | Tatsukami et al. .......... | 385/143 |
| 5,062,680 A | * | 11/1991 | Imamura et al. ............ | 385/143 |
| 5,524,164 A | * | 6/1996 | Hattori et al. ............... | 385/114 |
| 5,555,525 A | * | 9/1996 | Ho et al. ..................... | 385/143 |
| 5,574,100 A | * | 11/1996 | Sagane et al. ............... | 525/75 |
| 6,005,137 A | * | 12/1999 | Moore et al. ............... | 560/139 |
| 6,824,956 B1 | * | 11/2004 | Sato ........................ | 430/270.1 |

FOREIGN PATENT DOCUMENTS

| | | | |
|---|---|---|---|
| JP | 61-130904 A | | 6/1986 |
| JP | 08-220349 A | | 8/1996 |
| JP | 2004-112395 | * | 11/2001 |
| JP | 2002-258068 A | | 9/2002 |

* cited by examiner

*Primary Examiner*—Brian Healy
*Assistant Examiner*—Charlie Peng
(74) *Attorney, Agent, or Firm*—Sughrue Mion, PLLC

(57) ABSTRACT

A clad is produced by polymerizing methyl methacrylate and (meth)acrylic acid ester having alicyclic hydrocarbon group. A core is produced by an interfacial-gel-polymerization method. A first covering layer having a thickness being less than 500 μm is formed on an outer surface of the clad to produce a single-fiber optical cable. A plurality of the single-fiber optical cables are bundled. A gap between the single-fiber optical cables is infused with a filler. The bundled single-fiber optical cables are covered with a second covering layer to produce a multi-fiber optical cable. Since the covering layer is thin, the multi-fiber optical cable has excellent flexibility and reduced bending loss.

16 Claims, 4 Drawing Sheets

PLASTIC FIBER-OPTIC CABLE AND PRODUCING METHOD FOR THE SAME

BACKGROUND OF THE INVENTION

1. Field of the Invention

The present invention relates to a plastic fiber-optic cable and a producing method for the same, and also relates to a bundle of the plastic fiber-optic cables and a producing method for the same.

2. Description of the Related Art

A plastic optical fiber (hereinafter, simply called as optical fiber sometimes) is easily produced and processed in comparison with a quartz-based optical fiber. The plastic optical fiber has a low risk for an accident in that a human body is stabbed. From these viewpoints, the plastic optical fiber is in the spotlight as an optical communication medium for a short range wherein an amount of transmission loss is left out of consideration. In particular, the plastic optical fiber is noted for home use and car use.

In general, the plastic optical fiber is constituted of a core and a clad. The core is formed from an organic compound in which polymers are in matrix. The clad is formed from another organic compound having a different refractive index (generally, lower refractive index) relative to the core. In particular, with respect to the plastic optical fiber of a graded index type comprising the core, which has graded-index distribution directing from the center toward the outside, it is possible to widen a band of an optical signal to be transmitted. Thus, this kind of the plastic optical fiber is recently noted as the optical fiber having high transmission capacity (see Japanese Patent Laid-Open Publication No. 61-130904 pp. 3–4 and International Patent Laid-Open Publication No. 93/08488 Leaflet, for instance). As one of methods for producing such a graded-index-type optical member, is proposed a certain method in which an optical member preform (hereinafter, simply called as preform) is produced by utilizing interfacial gel polymerization, and then, is stretched.

By the way, it is required that the optical fiber has small transmission loss in a high band. Moreover, it is also required that the optical fiber has moisture resistance to prevent optical properties thereof from deteriorating due to absorption of moisture. For example, a copolymer comprising cyclohexyl methacrylate and methyl methacrylate is proposed. However, in order to reduce moisture absorption, it is necessary to use a comparatively large amount of the cyclohexyl methacrylate. Thus, scope of usage is restricted. Further, as a result, heat resistance of methacrylate-based resin declines. Improving this point is required. Meanwhile, it is proposed to replace hydrogen of plastic construction with heavy hydrogen, halogen of fluorine and so forth. However, a homopolymer of monomer including fluorine sometimes causes a disadvantage regarding material stability, adhesion and so forth. This material does not have all of capabilities required for the optical fiber. By the way, the heat resistance may be improved by selecting a raw material. As an example of this, there is a polymer comprising a monomer into which an alkyl group is introduced via a carbon atom (see Japanese Patent Laid-Open Publication No. 8-220349 pp. 3–8, for instance). A glass transition temperature of this polymer, however, is not so high (see a document of "H. Kawai et al., SPIE VOL. 896 Replication and Molding of Optical Components, 69–78 (1988)" for instance) in comparison with polymethyl methacrylate (hereinafter called as PMMA). Thus, it is supposed that this polymer does not have sufficient heat resistance. Further, H of C—H bond is replaced with a large atom of Cl and Br. Such replacement is not preferable, since deterioration of reactivity is caused.

In the meantime, the optical fiber merely constituted of the core and the clad is sometimes used. However, in a case that the optical fibers are gathered in the bare state such as a bundle fiber, there arise the following problems.

i) General acrylic resin such as the PMMA has high moisture absorption so that the loss caused by the absorption of moisture increases depending on a wavelength of a light source. This phenomenon becomes remarkable, upon reducing a fiber diameter, due to a relationship between a volume of the optical fiber and a side area.

ii) It is assumed that the transmission loss increases due to damage of the clad to be caused by friction of them.

In consideration of the above, is normally used an optical member (hereinafter called as fiber-optic cable) provided with a covering layer formed on the optical fiber. When the optical fibers are attached or mounted in high density, sometimes the single-fiber plastic optical cables (hereinafter called as single-fiber cable) are bundled to be used as a multi-fiber plastic optical cable (hereinafter called as multi-fiber cable), in the purpose of saving a space. With respect to the multi-fiber cable, the following forms are known (see Japanese Patent Laid-Open Publication No. 2002-258068p.2, for instance).

iii) The plural cores having high refractive index are surrounded with the clad so as to be bundled. After that, an outer surface of the clad is covered with a protect layer (first covering layer) for protecting the optical fiber.

iv) The optical fibers having a concentric structure, in which the clad surrounds the core, are gathered to form a cylindrical shape wherein a third resin exists between the respective optical fibers. A protect layer covers the optical fibers in a mass.

v) The clad surrounds the core so as to have a concentric structure, and an outer surface thereof is covered with a first protect layer (first covering layer) to form a single-fiber cable. After that, the single-fiber cables are covered with a second protect layer (second covering layer) in a mass.

It is possible to heighten the density by reducing a diameter of the single-fiber cable and the optical fiber to be bundled.

However, it is difficult to heighten the density of the multi-fiber cables having the form of the above iii), since the covering layer of the single-fiber cable is thick. Thereupon, it is considered to thin the first covering layer in order to heighten the density of optical transmission lines. In this case, however, the multi-fiber cable has inferior moisture resistance so that a problem will be caused.

SUMMARY OF THE INVENTION

In view of the foregoing, it is a primary object of the present invention to provide a plastic fiber-optic cable, which has excellent moisture resistance notwithstanding a thin covering layer.

It is a second object of the present invention to provide a producing method for a plastic fiber-optic cable having excellent moisture resistance in spite of a thin covering layer.

It is a third object of the present invention to provide a bundle of plastic fiber-optic cables having excellent moisture resistance and high density.

It is a fourth object of the present invention to provide a producing method for a bundle of plastic fiber-optic cables having excellent moisture resistance and high density.

In order to achieve the above and other objects, the plastic fiber-optic cable according to the present invention includes an optical fiber and a covering layer. The optical fiber comprises a core and a clad, which are made from plastic, and the covering layer covers the optical fiber. The core is formed from a material in that a polymerizable composition for an optical member, which includes at least a polymerizable monomer represented by the following formula (1), is polymerized. A thickness of the covering layer is less than 500 µm and is much preferable to be 200 µm or less.

(In this formula, $X^1$ denotes a hydrogen atom (H) or a deuterium atom (D), and the respective $X^1$s may be same or may be different. $Y^1$ denotes H, D, CH3 group, CD3 group, halogen atom or CF3 group. Further, $R^1$ denotes a 7–20C alicyclic hydrocarbon group.)

It is preferable that the core has refractive-index distribution so as to reduce a refractive index from the center of the core toward a periphery thereof. Moreover, it is preferable that a dynamic friction coefficient of a material for forming the covering layer is 0.45 or less, and much preferably is 0.3 or less. Incidentally, in the present invention, a value measured by a measurement method based on JIS K7125 is used as the dynamic friction coefficient. A diameter of the core is preferable to be 600 µm or less. In the present invention, the diameter of the core means an average of values obtained by measuring five places of the core.

The plastic fiber-optic cables of the present invention are gathered to form a bundle of the plastic fiber-optic cables.

In a producing method for the plastic fiber-optic cable, the clad and the core of the optical fiber, which are made from plastic, are formed from a material in that a polymerizable monomer represented by the forgoing formula (1) is polymerized. The optical fiber is covered with the covering layer. A thickness of the covering layer is less than 500 µm, and much preferably is 200 µm or less.

It is preferable to include a step that the core is formed so as to have a diameter of 600 µm or less. The producing method for the plastic fiber-optic cable according to the present invention further includes a step that the plastic fiber-optic cables are gathered to produce a bundle of the plastic fiber-optic cables.

According to the plastic fiber-optic cable of the present invention, although the thickness of the covering layer is less than 500 µm, the fiber-optic cable is excellent in moisture resistance because moisture resistance of the optical fiber is excellent. Further, since the thickness of the covering layer is less than 500 µm, the plastic fiber-optic cable having excellent flexibility is obtained.

The fiber-optic cables of the present invention are gathered to form the bundle of the fiber-optic cables. This bundle has a reduced bending loss and is excellent in flexibility. Further, since the thickness of the covering layer is less than 500 µm, a proportion of the optical fiber rises on a cross section of the bundle so that wiring may be efficiently performed in a smaller space.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

[Raw Material]

First of all, a polymerizable composition for an optical fiber is described below. As to the polymerizable composition to be used in the present invention, a polymerizable monomer (A) represented by the following formula (1) is employed. In some cases, the polymerizable composition includes a polymerization initiator and a compound having a refractive index different from the polymerizable monomer. The polymerizable composition of the present invention is used for producing an optical member, especially for producing a graded-index-type optical member having refractive-index distribution.

The polymerizable monomer (A) represented by the above formula (1) is (meth)acrylate in which $R^1$ is a 7–20C alicyclic hydrocarbon group. In the formula, $X^1$ denotes a hydrogen atom (H) or a deuterium atom (D), and $Y^1$ denotes H, D, CH3 group or CD3 group. For example, there are (meth)acrylic acid (bicyclo[2.2.1]heptyl-2), (meth)acrylic acid1-adamanthyl, (meth)acrylic acid2-adamanthyl, (meth)acrylic acid3-methyl-1-adamanthyl, (meth)acrylic acid3,5-dimethyl-1-adamanthyl, (meth)acrylic acid3-ethyladamanthyl, (meth)acrylic acid3-methyl-5-ethyl-1-adamanthyl, (meth)acrylic acid3,5,8-triethyl-1-adamanthyl, (meth)acrylic acid3,5-dimethyl-8-ethyl-1-adamanthyl, (meth)acrylic acid octahydro-4,7-menthanoindene-5-yl, (meth)acrylic acid octahydro-4,7-menthanoindene-5-ylmethyl, (meth)acrylic acid tricyclodecyl, (meth)acrylic acid3-hydroxy-2,6,6-triethyl-bicyclo[3.1.1]heptyl, (meth)acrylic acid3,7,7-triethyl-4-hydroxy-bicyclo[4.1.0]heptyl, (meth)acrylic acid (nor)bornyl, acrylic acid isobornyl, methacrylic acid isobornyl, (meth)acrylic acid fenchyl, and (meth)acrylic acid2,2,5-trimethylcyclohexyl. In the (meth)acrylic acid ester, are preferable the methacrylic acid (nor)bornyl, the (meth)acrylic acid isobornyl and the methacrylic acid fenchyl. Especially, the methacrylic acid (nor)bornyl and the (meth)acrylic acid isobornyl are preferable.

The polymerizable monomer is produced by esterifying the (meth)acrylic acid or an acid chloride thereof, with alicyclic hydrocarbon.monool represented by $R^1OH$. In another way, the polymerizable monomer is produced by esterifying (meth) acrylic acid and alicyclic hydrocarbon precursor of camphene etc., with an acid catalyst of sulfuric acid, p-toluenesulfonic acid and so forth. Incidentally, $R^1$ is same with that of the forgoing formula (1). Moreover, $Y^1$ of C—$Y^1$ of (meth)acrylate is preferable to be a hydrogen atom (H) and methyl group (CH3).

In a case of a certain wavelength of a light source used for optical transmission, absorption caused by C—H bond disturbs the transmission. In such a case, it is preferable that the hydrogen atom (H) of C—H of (meth)acrylic group ($X^1$ of the forgoing formula (1)) is replaced with a deuterium atom (D) as well, and a replacement rate thereof is preferable to be 95% or more and less than 100%. Further, it is preferable to replace the hydrogen atom (H) of $Y^1$ of the foregoing formula (1) with a deuterium atom (D) and deuterated methyl group ($CD_3$). Furthermore, the hydrogen atom (H) of C—H of $R^1$ may be replaced with a deuterium atom (D).

It is sufficient that the polymerizable composition for the optical member according to the present invention includes the polymerizable monomer (A) as an essential ingredient. It is necessary to include the polymerizable monomer (A) in the whole polymerizable monomer by 5 mass % or more, preferably by 7.5 mass % or more, and much preferably by 10 mass %. In this specification, expression of "included as main ingredient" means that other monomer may be included on condition that optical performance of polymer is maintained.

Polymerizable polymer used in the present invention is further described below. Although the PMMA is excellent in optical properties, an ester bond (—COO—) is included in a polymer skeleton. The ester bond has hydrophilicity so that a rate of saturated water absorption is large and is about 2%. Since the ester bond absorbs moisture while used as the optical fiber, sometimes an optical property and a mechanical strength deteriorate. In consideration of this, in the present invention, water absorption of polymer is lowered by bonding an oxygen-atom side of the ester bond (—COO—) with a hydrocarbon group having hydrophilicity, especially with an alicyclic hydrocarbon group. By replacement of the alicyclic hydrocarbon group, intermolecular interaction increases relative to the ester bond of adjacent acrylic acid polymer so that heat resistance is improved and mechanical strength rises.

Incidentally, regarding the moisture absorption, it is preferable that transmission loss caused by energy absorption of water molecule is low. In the present invention, a difference between the transmission losses measured by using a light source, which has a wavelength of 850 nm, is preferable to be 80 dB/km or less before and after placement executed under conditions of temperature 100° C., humidity 70% and 20 hours. It is much preferable to be 50 dB/km or less, and is especially preferable to be 20 db/km or less.

Besides the above-mentioned polymerizable monomer (A), examples of available polymerizable monomers are particularized below. As for a (meth)acrylic ester compound, there are methacrylic acid methyl, methacrylic acid ethyl, methacrylic acid n-propyl, methacrylic acid n-butyl, acrylic acid methyl, acrylic acid ethyl, acrylic acid n-propyl, acrylic acid n-butyl and so forth. As styrene based compounds, there are styrene, α-methyl styrene, chlorostyrene, bromostyrene and so forth. Further, as vinyl esters, there are vinyl acetate, vinyl benzoate, vinyl phenylacetate, vinyl chloroacetate and so forth. Furthermore, as maleimides, there are N-n-butyl maleimide, N-tert-butyl maleimide, N-isopropyl maleimide, N-cyclohexyl maleimide and so forth. The present invention is not limited to these examples. Among the above, the methacrylic acid methyl is preferable. It is also preferable to replace a hydrogen atom of the respective monomers with a deuterium atom.

The polymerizable composition of the present invention starts the polymerization of the above polymerizable monomer (A) and the other polymerizable monomers. It is possible to properly select the polymerization initiator depending on the monomer to be used and the polymerizing method. Concretely, there are peroxide-based compounds and so forth of benzoyl peroxide(BPO), t-butylperoxy-2-ethylhexanate(PBO), di-t-butylperoxide(PBD), t-butylperoxy isopropyl carbonate(PBI), n-butyl4,4-bis(t-butylperoxy) valerate(PHV), etc. In addition, there are azo-based compounds of 2,2'-azobisisobutyronitrile, 2,2'-azobis(2-methylbutylonitrile), 1,1'-azobis(cyclohexane-1-carbonitrile), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methylpropionate), di-t-butyl2,2'-azobis(2-methylpropionate), etc. Incidentally, plural kinds of the polymerization initiators may be used together.

It is preferable that the polymerizable composition of the present invention includes a chain transfer agent of the above polymerizable monomer. The chain transfer agent is mainly used for adjusting molecular weight of the polymer. When the polymerizable compositions respectively include the chain transfer agent, it is possible to control a degree of polymerization and a polymerization rate of polymerizable monomer by the chain transfer agent. Further, it is possible to adjust the molecular weight of the polymer to a desired value. For example, the polymerizable composition of the present invention is polymerized, and after that, is drawn by orientation to form an optical transmitting body. In this case, by adjusting the molecular weight, mechanical properties at the time of the orientation are set within a desired range so as to contribute to improvement of productivity. As to the polymerization initiator, a kind and an additive amount thereof may be properly selected depending on the kind of the polymerizable monomer to be used together. A chain transfer constant of the chain transfer agent regarding the respective monomers may be determined, referring to Polymer Handbook third edition (edited by J. BRANDRUP and E. H. IMMERGUT, and issued by JOHN WILEY & SON), for instance. Alternatively, the chain transfer constant may be determined by experiment, referring to "Experimental Method for High Polymer Synthesis" edited by Takayuki OHTSU and Masaetsu KINOSHITA, and issued in 1972.

As to the chain transfer agent, it is preferable to use an alkylmercaptan group (n-butyl mercaptan, n-pentyl mercaptan, n-octyl mercaptan, n-lauryl mercaptan, t-dodecyl mercaptan, etc.) and a thiophenol group (thiophenol, m-bromothiophenol, p-bromothiophenol, m-toluenethiol, p-toluenethiol, etc.). In particular, it is preferable to use the alkylmercaptan of the n-octyl mercaptan, the n-lauryl mercaptan and the t-dodecyl mercaptan. It is also possible to use another chain transfer agent in which the hydrogen atom (H)

of the C—H bond is replaced with a deuterium atom (D) and a fluorine atom (F). Incidentally, plural kinds of the chain transfer agents may be used together.

The polymerizable composition of the present invention may include a refractive-index controlling component. A graded-index-type optical member is produced such that a density of the refractive-index controlling component included in the polymerizable composition is gradated in a polymerizing direction at the time of polymerization. The graded-index-type optical member may have a wide transmission band. With respect to this kind of the graded-index-type optical member, it is possible to employ both types thereof, in one of which the refractive index gradually reduces from the center of the core toward a periphery thereof, and in the other of which the refractive index reduces stepwise toward the outside. The latter type is called as multi-step index type. The former type (graded index type) is especially preferable. In the case the core has the graded index, a refractive-index controlling agent is added in order to adjust the refractive index, and mechanical properties of the raw material changes regarding the periphery and the center of the core in accordance with a copolymerization ratio of a copolymer. Influences due to these factors are weakened so that the present invention is effective in this sense.

The refractive-index controlling component has a refractive index different from the above polymerizable monomer to be used together, and may be any of a low-molecular compound and a high-molecular compound. The difference between the refractive indexes is preferable to be 0.005 or more. It is preferable to use the refractive-index controlling component having a property for making the refractive index higher in comparison with a polymer in which the refractive-index controlling component is not added. The refractive-index controlling component may be a polymerizable compound. In a case that the polymerizable compound is the refractive-index controlling component, it is preferable to use the polymerizable compound having a property for raising the refractive-index in comparison with a polymer in which the polymerizable compound is not included as a copolymerizable component. As the refractive-index controlling component, it is possible to employ the substance having the above property and being capable of stably existing together with the polymer, further being stable under a polymerization condition (regarding heating, pressure and so forth) of the polymerizable monomer being as the forgoing raw material. For example, the polymerizable composition used for forming the core includes the refractive-index controlling component. In a process for forming the core, a polymerizing direction is controlled by an interfacial gel polymerization method to gradate the density of the refractive-index controlling component. In this way, it is preferable to form a graded-index structure in the core on the basis of density distribution of the refractive-index controlling component. (Hereinafter, the core having the graded index is sometimes called as graded-index-type core.) By forming the graded-index-type core, the obtained optical member becomes a graded-index-type plastic optical member having a wide transmission band.

As the refractive-index controlling component, there are low-molecular compounds, for instant, of dibutyl phthalate, benzyl benzoate(BEN), sulfurated diphenyl(DPS), triphenyl phosphate(TPP), phthalic acid benzyl n-butyl(BBP), phthalic acid diphenyl(DPP), biphenyl(DP), diphenyl-methane(DPM), tricresyl phosphate(TCP), diphenyl sulfoxide(DPSO), sulfurated diphenyl derivative, dithian derivative, and so forth. The sulfurated diphenyl derivative and the dithian derivative are properly selected from compounds concretely shown as the following D1 through D11. In particular, are preferable the BEN, the DSP, the TPP, the DPSO, the sulfurated diphenyl derivative and the dithian derivative. Incidentally, a hydrogen atom existing in these compounds may be replaced with a deuterium atom for the purpose of improving transparency in a wide wavelength band. Meanwhile, as the polymerizable compound, there are tribromophenyl methacrylate and so forth. In the case that the polymerizable compound is used as the refractive-index controlling component, the polymerizable monomer is copolymerized with the polymerizable refractive-index controlling component when a matrix is formed. Thus, it becomes more difficult to control various properties (especially optical properties). However, there is a possibility that advantage is obtained in point of a heat resistance property.

(D1)

(D2)

(D3)

(D4)

(D5)

(D6)

(D7)

-continued (D8)

(D9)

(D10)

(D11)

It is possible to change the refractive index of the optical member to a desired value by adjusting the density and the distribution of the refractive-index controlling agent. An additional amount of that is properly determined in accordance with a use and a member to be combined. Plural kinds of refractive-index raising agents may be added.

When heat and/or light are applied to the polymerizable composition used in the present invention, a radical and so forth generate from the polymerization initiator, for instance, and polymerization of the polymerizable monomer is started. In a case the polymerizable composition of the present invention includes the refractive-index controlling component, the graded-index structure is formed by a method in that the polymerizing direction is controlled to gradate the density of the refractive-index controlling component such as an interfacial gel polymerization method. Meanwhile, in a case the polymerizable composition does not include the refractive-index controlling component, the graded-index structure is formed by gradating a copolymerization rate of the polymerizable monomer. Further, it is possible to adjust the molecular weight of the polymer to a desired value by controlling a polymerization degree and a polymerization rate of the polymerizable monomer with the polymerization initiator and the chain transfer agent to be optionally added. By adjusting the molecular weight of the polymer to be produced by the chain transfer agent (preferably ten thousand to one million, and much preferably thirty thousand to fifty thousand), it is possible at the time of stretching to put mechanical properties within a desired range so that productivity may be improved.

As to the plastic optical fiber, it is preferable that weight-average molecular weight (Mw) of the polymerizable composition is ten thousand to one million. When the molecular weight is smaller than this range, mechanical strength and so forth are lowered. In contrast, when the molecular weight is larger than the above range, processability deteriorates. By selecting a proper range of the molecular weight, it is possible to satisfy thermal physical properties (Tg) of a product, processability at the time of stretching under heating, and mechanical strength at that time.

[Producing Method for the Optical Fiber]

Hereinafter, is described a producing method for the optical fiber to be used for a fiber-optic cable according to the present invention. The following description relates to an embodiment of a method for producing a graded-index-type plastic optical fiber (GI type). This type, however, is not exclusive to the optical fiber to be used in the present invention. Although two kinds of embodiments are mainly described, these embodiments are not exclusive. Primarily, the first embodiment relates to a plastic optical-member producing method including a first process, a second process and a third process. In the first process, a polymerizable composition for forming a clad is polymerized to produce a cylindrical tube being as the clad. In the second process, an interfacial-gel-polymerization of a polymerizable composition for forming a core is performed in a hollow portion of the cylindrical tube to form a region of the core. The second process is for producing a preform comprising the regions respectively corresponding to the core and the clad. In the third process, the obtained preform is processed so as to have a desired form.

The second embodiment relates to another plastic optical-member producing method including a first process, a second process, a third process and a fourth process. In the first process, a cylindrical pipe corresponding to a clad is produced. This cylindrical pipe is made from a fluorine-containing resin of a polyvinylidene fluoride resin, for example. In the second process, a concentric cylindrical pipe comprising two layers is produced by rotationally polymerizing a polymerizable composition, which is for forming an outer core, on an inner wall of a hollow portion of the fluororesin pipe. In the third process, an interfacial-gel-polymerization is performed in a hollow portion of the concentric cylindrical pipe by using a polymerizable composition, which is for forming an inner core, to form a region being as the inner core. The third process is for producing a preform comprising the regions respectively corresponding to the clad, the outer core and the inner core. In the fourth process, the obtained preform is processed so as to have a desired form. As to the latter embodiment, when the concentric cylindrical pipe comprising the two layers is produced, it is possible to adopt another method instead of the stepwise manner described above. In this alternative method, a polymer comprising the fluorine resin and the polymerizable composition of the outer core is produced in one step of a melt co-extrusion method.

Either of the clad and the outer-core-forming polymerizable composition includes a polymerizable monomer, a polymerization initiator for starting the polymerization of the polymerizable monomer, and a chain transfer agent. Meanwhile, either of the core and the inner-core-forming polymerizable composition includes a polymerizable monomer, a polymerization initiator for starting the polymerization of the polymerizable monomer, a chain transfer agent, and a compound (refractive-index controlling component) having a refractive index different from that of the above monomer. This compound is included as need arises. With respect to the polymerizable compositions for forming combinations of the clad/the core and the outer core/the inner core, it is preferable that the polymerizable monomers to be used therein are same. Incidentally, proportions of composition may be different, and sub-components may be also different.

In accordance with sorts of the polymerizable compositions for forming the clad and the core, a preferable range of a component proportion thereof is different so that it is impossible to unconditionally determine it. In general, however, it is preferable that the polymerization initiator is 0.005–0.5 mass % relative to the polymerizable monomer, and much preferably 0.01–0.5 mass %. As to the chin transfer agent, it is preferable to be 0.10–0.40 mass % relative to the polymerizable monomer, and much preferably 0.15–0.30 mass %. In the polymerizable composition for forming the core, it is preferable that the refractive-index controlling component is 1–30 mass % relative to the polymerizable monomer, and much preferably 1–25 mass %.

The polymerizable compositions for forming the clad and the core are polymerized to produce a polymer component. It is preferable, in view of stretching of the preform, that a molecular weight of the polymer component is ten thousand to one million in terms of weight-average molecular weight (Mw), and much preferably thirty thousand to half million. From a viewpoint of a stretching property, there is an influence of molecular weight distribution (MWD=weight-average molecular weight/number-average molecular weight). When the MWD is large, the stretching property deteriorates if a component having extremely high molecular weight is slightly included. In some cases, it becomes impossible to carry out the stretching. Thus, as a proper range, the MWD of 4 or less is preferable, and the MWD of 3 or less is much preferable.

The polymerizable composition for forming the clad and the core may include other refractive-index controlling components on condition that optical transmission properties and reactivity of polymerization are not lowered. For instance, stabilizers of an oxidation-resistant agent, a light-resistant agent and so forth may be included for the purpose of improving weather resistance, durability and so forth. Further, a compound having an inductively emitting function, which is for amplifying an optical signal, may be included in order to improve optical transmission properties. By adding this compound, attenuated signal light can be amplified by excitation light. Thus, a transmission length is improved so that it is possible to use it as a fiber amplifier at a part of an optical transmission link.

Next, the respective processes of the present embodiment, especially of the first embodiment, are described bellow. In the first process, a hollow (cylindrical, for example) tube being as the clad is produced. As to a method for producing the hollow tube, there is a method described in International Patent Publication No. WO93/08488, for instance. Concretely, the polymerizable composition for forming the clad is injected into a cylindrical polymerization container or a pipe made from fluorine resin. The polymerization container and the pipe may be further put in a cylindrical container. Successively, the polymerizable monomer is polymerized, rotating the polymerization container or the pipe, to produce a cylindrical tube made from the polymer. In a proper manner, the cylindrical container is rotated in a state that an axis thereof is horizontally kept. Incidentally, it is preferable that dust included in the composition is removed by percolating the polymerizable monomer with a filter before the polymerizable monomer is injected into the polymerization container. A polymerization temperature and a polymerization time are different depending on the monomer and the polymerization initiator to be used. In general, however, it is preferable that the polymerization temperature is 60–150° C., and the polymerization time is 5–24 hours. At this time, the raw material may be pre-polymerized to increase viscosity of the raw material, such as described in Japanese Patent Laid-Open Publication No. 8-110419. Meanwhile, if the container used for the polymerization is transformed due to the rotation, deformation is caused on the obtained cylindrical tube. In view of this, it is desirable to use a metallic tube and a glass tube having sufficient rigidity.

It is preferable that the cylindrical tube being as the clad has the bottom so as to receive the polymerizable composition, which is the raw material of the core, during the second process. Material of the bottom is preferable to have adhesive properties with the polymer constituting the cylindrical tube. The bottom may be made from the same polymer with the cylindrical tube. For instance, the bottom made from the polymer can be formed such that a small amount of the polymerizable monomer is injected into the polymerization container and is polymerized in a state that the polymerization container is vertically settled before or after the polymerization, which is performed during the rotation of the polymerization container (in the following description, sometimes called as "rotational polymerization").

After the rotational polymerization, a thermal process may be performed for the constitution, which is obtained in a temperature higher than the polymerization temperature of the rotational polymerization, for the purpose of completely reacting the remaining monomer and the remaining polymerization initiator. Unpolymerized composition may be removed after obtaining the desired hollow tube.

In the first process, it is also possible to obtain the constitution of a desired form by utilizing a forming technique of extrusion molding and so forth after the polymerizable composition has been polymerized to produce the polymer. In this embodiment, the desired form is the single cylindrical form or the double (coaxial) cylindrical form comprising the fluorine resin and the polymerizable composition polymer.

In the second process, the polymerizable composition for forming the core or the inner-core is injected into the hollow portion of the cylindrical tube, which has been produced in the first process as the clad or the outer-core, to polymerize the polymerizable monomer of the composition. It is preferable to percolate the composition with a filter for removing impurities included therein. As to a polymerizing method, an interfacial-gel-polymerization method, in which a solvent and so forth are not used, is especially preferable from a viewpoint of a residue existing after the polymerization. By adopting the interfacial-gel-polymerization method, polymerization of the polymerizable monomer advances in a sectional radius direction from an inner surface having high viscosity toward the center. When the polymerizable monomer is polymerized after adding the refractive-index controlling component, the monomer having high affinity with the polymer, which constitutes the cylindrical tube, is unevenly polymerized on the inner surface of the cylindrical tube so that the polymer having low density of the refractive-index controlling component is formed at an outer side. In the formed polymer, a ratio of the refractive-index controlling component increases toward the center. In this way, density distribution of the refractive-index controlling component occurs in an area of the core. On the basis of this density distribution, continuous distribution of the refractive index is introduced.

As described above, the distribution of the refractive index is introduced in the area of the formed core during the second process. However, thermal behaviors are different from each other in portions having different refractive indexes. If the polymerization is performed at a constant temperature, responsibility of volume shrinkage caused by polymerization reaction changes due to the difference of the thermal behaviors in the area of the core so that bubbles and fine air space occur inside the preform. Thus, there is a possibility that large number of bubbles occur when the obtained preform is heated and stretched. If the polymerization temperature is too low, polymerization efficiency is lowered and it takes a time to complete the reaction so that productivity markedly deteriorates. Further, in this case, the polymerization is imperfectly performed and a light transmitting property is lowered so that optical transmission performance of the optical fiber to be produced is damaged. In the meantime, if the polymerization temperature of the forepart is too high, it is impossible to responsively slacken the shrink of the area being as the core so that the bubbles are likely to occur. In view of this, the polymerization temperature and a post-treatment temperature are adjusted, taking account of a boiling point of the monomer and a glass transition temperature (Tg) of the polymer to be produced. At this time, the post-treatment temperature is selected so as to be equal to or more than the glass transition temperature (Tg) of the polymer. For example, when the monomer of typical methacrylate base is used, the polymerization temperature is preferably 60–160° C., and much preferably 80–140° C. It is also preferable to perform the polymerization in pressurized inert gas in order to improve responsibility for polymerization shrinkage. It is possible to reduce occurrence of the bubbles by dehydrating and degassing the unpolymerized monomer in atmosphere of reduced pressure.

The polymerization temperature and the polymerization time vary depending on the monomer to be employed. In general, however, the preferable polymerization temperature is 60–150° C. and the preferable polymerization time is 5–72 hours. Concretely, when the isobornyl methacrylate is used as the polymerizable monomer and the 2,2'-azobis(2,4,4-trimethylpentane) is used as the polymerization initiator, it is preferable that the initial polymerization temperature is maintained at 100–110° C. for 48–72 hours, and then, the polymerization is performed for 24–48 hours after raising the polymerization temperature up to 120–160° C. When the di-t-butylperoxide is used as the polymerization initiator, it is preferable that the initial polymerization temperature is maintained at 90–110° C. for 4–48 hours, and then, the polymerization is performed for 24–48 hours after raising the polymerization temperature up to 120–160° C. Incidentally, raising the temperature may be carried out in either of a stepwise manner and a continuous manner. In any event, it is desirable to shorten the time to be taken for raising the temperature.

It is preferable that the polymerization is performed in a pressurized state (hereinafter, the polymerization performed in the pressurized state is called as "pressure polymerization"). In the case of the pressure polymerization, it is preferable that the polymerizable composition is injected into the cylindrical tube being as the clad, and this cylindrical tube is inserted into a hollow portion of a jig to perform the polymerization in a state that the jig holds the cylindrical tube. A shape of the jig has a hollow into which the construction can be inserted. This hollow is preferable to have a shape similar to the construction. In this embodiment, since the construction being as the clad is the cylindrical tube, the jig is preferable to have a cylindrical shape. The jig prevents the cylindrical tube from deforming during the pressure polymerization. At the same time, the jig supports the cylindrical tube so as to restrain the area of the core from shrinking as the pressure polymerization proceeds. Thus, the hollow portion of the jig has a diameter larger than an outer diameter of the cylindrical tube of the clad, which is preferable to be supported in a non-contact state. It is preferable that the hollow portion of the jig has the diameter which is larger than the outer diameter of the cylindrical tube of the clad by 0.1–40%, and much preferably by 10–20%.

The cylindrical tube being as the clad is disposed inside the polymerization container in a state that the cylindrical tube is inserted into the hollow portion of the jig. It is preferable that the cylindrical tube is disposed so as to set a height direction thereof vertically. After the cylindrical tube supported by the jig has been disposed in the polymerization container, the inside of the polymerization container is pressurized. It is preferable that the inside of the polymerization container is pressurized with the inert gas of nitrogen and so forth. Further, it is preferable that the pressure polymerization is carried out under inert-gas atmosphere. With respect to a desirable range of the pressure at the time of polymerization, it depends on the monomer to be used. In general, however, the desirable pressure at the time of polymerization is 0.1–1.0 MPa. The preform of the optical member can be obtained through the forgoing processes.

In the third process, the produced preform is processed to obtain the optical member having a desired form. For instance, by slicing the preform perpendicularly to an axial direction, it is possible to obtain a disk-shaped lens or a cylindrical lens having a flat cross section. Alternatively, the optical fiber is obtained by stretching the preform.

The optical fiber is produced by thermally stretching the preform in the third process, and a heating temperature thereof is properly determined depending on the material and so forth of the preform. In general, it is preferable to stretch the preform in an atmosphere of 180–250° C. Conditions for stretching the preform (stretching temperature and so forth) is properly determined, taking account of the diameter of the obtained preform, the desired diameter of the optical fiber, the used materials and so forth. As to a drawing tensile force, 10 g or more is preferable in order to orient the melted plastic, such as described in Japanese Patent Laid-Open Publication No. 7-234322, and 100 g or less is preferable in order to prevent a strain from remaining after the fusion stretching, such as described in Japanese Patent Laid-Open Publication No. 7-234324. Further, such as described in Japanese Patent Laid-Open Publication No. 8-106015, it is possible to adopt a method in which pre-heating is performed at the time of stretching. With respect to the optical fiber to be obtained by the above method, lateral pressure characteristics and bend thereof may be improved by defining fracture elongation and hardness of the optical fiber to be obtained, such as described in Japanese Patent Laid-Open Publication No. 7-244220.

The optical fiber produced through the third process may be employed for various uses as it is. For the purposes of protection and reinforcement, it is preferable that the optical fiber is employed for various uses in a form having a covering layer or a fiber layer on a periphery, and/or as the multi-fiber optical cable in which the optical cables are bundled. Incidentally, with respect to the producing method for the optical fiber to be used for the single-fiber and multi-fiber optical cables according to the present invention, the above-described interfacial-gel-polymerization method is preferable. However, it is possible to adopt the other producing methods of a melt extrusion method and so forth.

[Formation of the Covering Layer (Producing Method for Single-Fiber Optical Cable)]

The optical fiber is covered with a layer to produce the single-fiber optical cable, or the plastic fiber-optic cable according to the present invention. A forming method for the covering layer (hereinafter called as first covering layer) is not especially restricted. However, it is preferable to adopt a melt extrusion method. The first covering layer may have a single-layer structure or a multi-layer structure. In the case of the multi-layer structure, by changing a raw material and additives of the respective layers, it is possible to add various functions for improving strength and preventing electrification, for instance, besides investing flame resistance properties described later.

Figure 1:
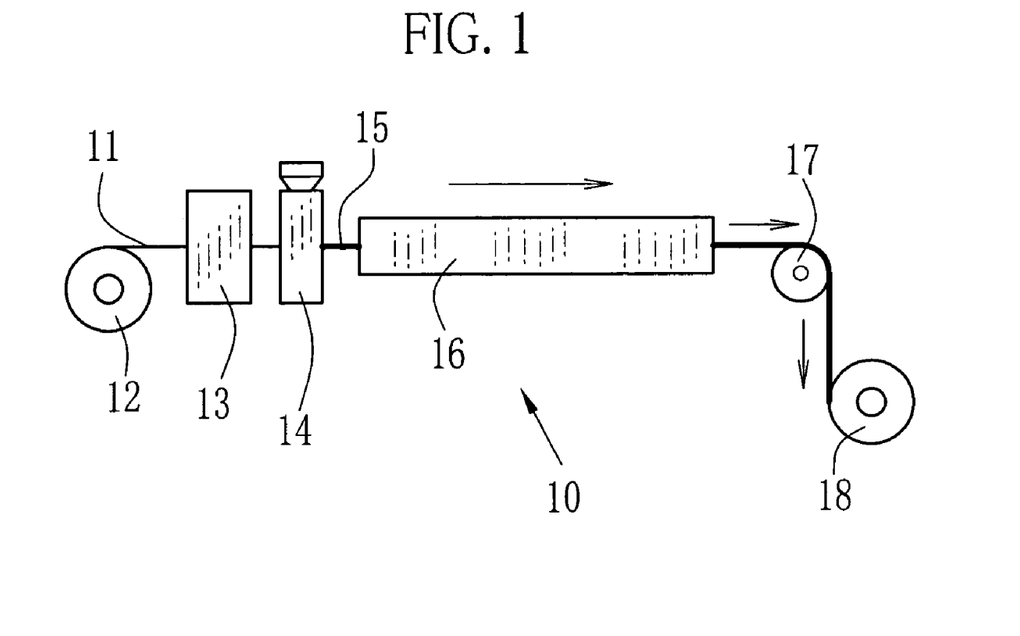
FIG. 1 is a schematic illustration explaining a producing method for a plastic fiber-optic cable according to the present invention.

FIG. 1 shows a covering process line 10 for producing the single-fiber optical cable according to the present invention. The optical fiber 11 is supplied from a feeder 12. In order to prevent the optical fiber 11 from being thermally damaged at the time of covering, it is preferable to cool the optical fiber 11 at a temperature of 5–35° C. by a first cooler 13. However, this cooler 13 may be removed. A covering machine 14 forms the first covering layer on the optical fiber 11. The covering machine 14 is provided with opposing dies having an opening through which the optical fiber passes. A melted substance for forming the cover layer is filled between the opposing dies. By moving the optical fiber in the dies, it is possible to obtain a single-fiber plastic optical cable 15 including the first covering layer 20 shown in FIG. 2. This optical cable 15 is cooled by a second cooler 16. After that, the optical cable 15 is advanced by a roller 17 to be taken up around a winding machine 18. By the way, in the present invention, the method for forming the first covering layer 20 is not restricted to the above. For instance, regarding the cooling method to be carried out after forming the covering layer, a water tank may be provided instead of the second cooler 16. In this case, the optical cable 15 is cooled with cold water, and then, is dried by a dryer.

Figure 2:
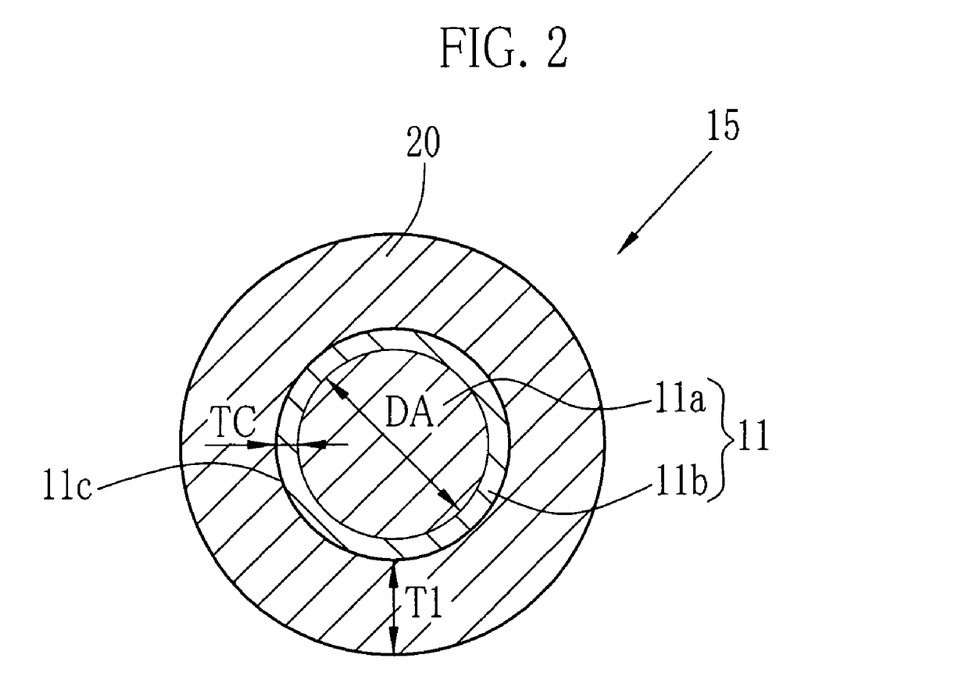
FIG. 2 is a sectional view showing the plastic fiber-optic cable.

FIG. 2 shows a cross section of the single-fiber optical cable 15 according to the present invention. The optical fiber 11 comprises a core 11a and a clad 11b. The first covering layer 20 is formed on a peripheral surface 11c of the clad 11b. In the present invention, a diameter DA of the core 11a and a thickness TC of the clad 11b are not especially limited. However, it is preferable that the DA(μm) is 600 μm or less in view of connection of fivers or connection to apparatus. Although the TC may be optionally selected in the present invention, it is preferable to thin the TC on condition that optical transmission performance and so forth are not affected. Further, in the present invention, a thickness T1 of the first covering layer 20 is less than 500 μm. Since a main ingredient of the optical fiber 11 is the polymer, which is polymerized from the monomer of the formula (1), the optical cable 15 can maintain moisture resistance in virtue of lipophilicity (namely water repellency) of the substituent $R^1$ being as the alicyclic hydrocarbon group. Incidentally, a protect layer of an appropriate material is formed around the periphery of the first covering layer 20, although an illustration thereof is abbreviated in FIG. 2.

It is not necessarily required that the center of the optical fiber having a circular cross section coincides with the center of the first covering layer 20. The centers of the cross section may be shifted in accordance with its use. When this kind of the plastic fiber-optic cable is fixed in an arc-like shape, optical transmission ability is prevented from lowering, by forming a covering layer having a proper thickness. The single-fiber optical cable according to the present invention is excellent in flexibility since the covering layer (first covering layer), whose thickness is less than 500 μm, is thin. Thus, a degree of freedom for arranging the fiber-optic cable is improved. Even if the optical cable is fixed so as to be used in an arc-like condition or the like, bending loss is prevented from occurring.

A substance for forming the first covering layer 20 of the single-fiber optical cable is not especially restricted on condition that the substance is a thermoplastic polymer having proper melt fluidity. However, it is preferable to use a polymer in which a dynamic friction coefficient of a material for forming the first covering layer 20 is small. The dynamic friction coefficient is preferable to be 0.45 or less and is much preferable to be 0.3 or less. In the present invention, the dynamic friction coefficient is represented by a value measured by a measuring method based on JIS K 7125. As preferable concrete examples, there are polyethylene(PE), polypropylene(PP), polytetrafluoroethylene (PTFE, TEE), perfluroalkoxy fluororesin(PFA), tetrafluoroethylene hexafluoropropylene copolymer(FEP), ethylene/ethylene tetrafluoride copolymer(ETFE), vinylidene fluoride (PVDF), polychlorotrifluoroethylene(PCTFE), vinyl fluoride(PDF) an so forth. The thermoplastic polymer may be selected from among polyolefin-based polymer, copolymer thereof, and polymer including one of fluorine and chlorine.

[Producing Method for Multi-Fiber Optical Cable]

Figure 3:
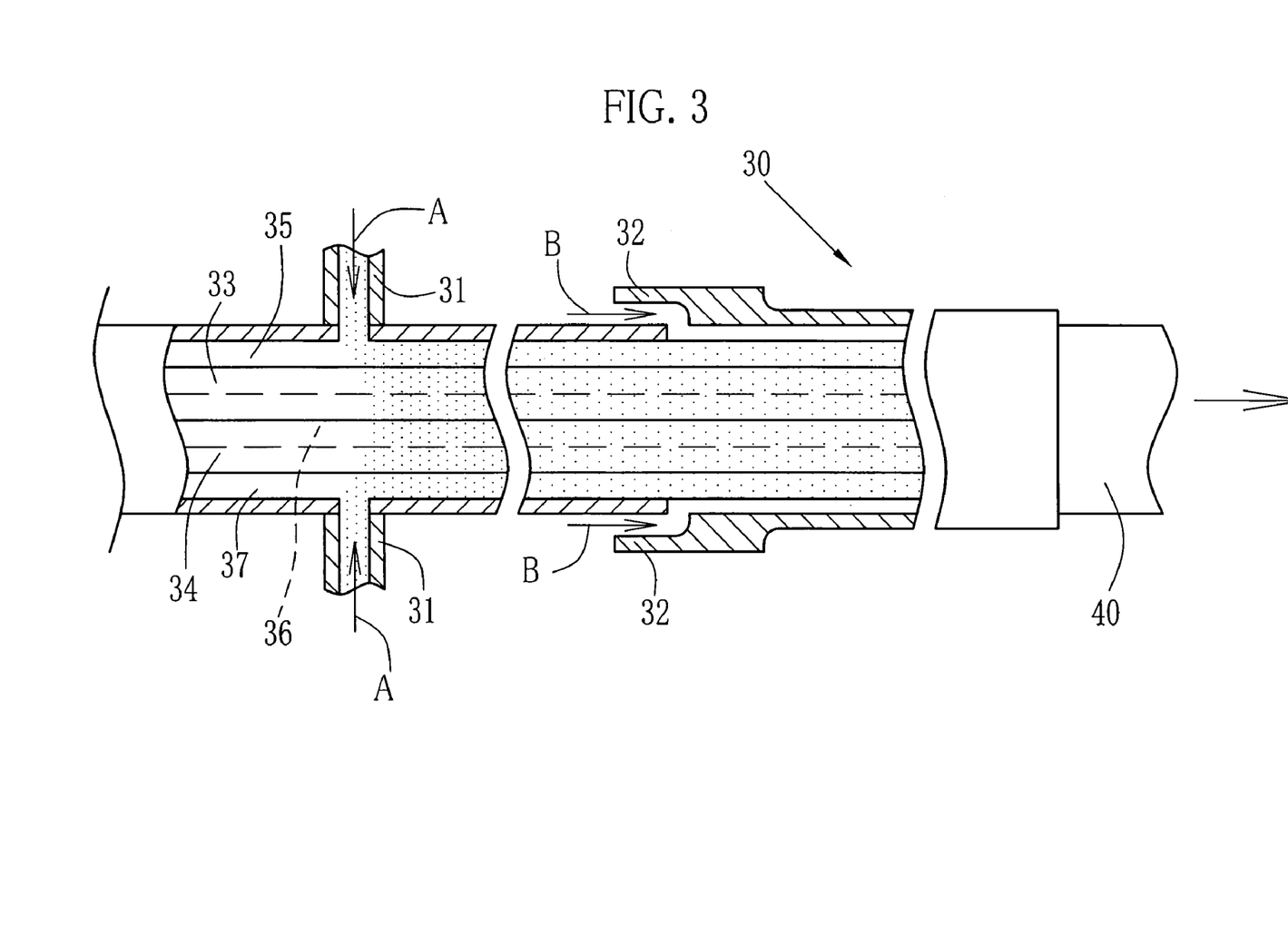
FIG. 3 is a schematic sectional view explaining a producing method for the plastic fiber-optic cable.
Figure 4:
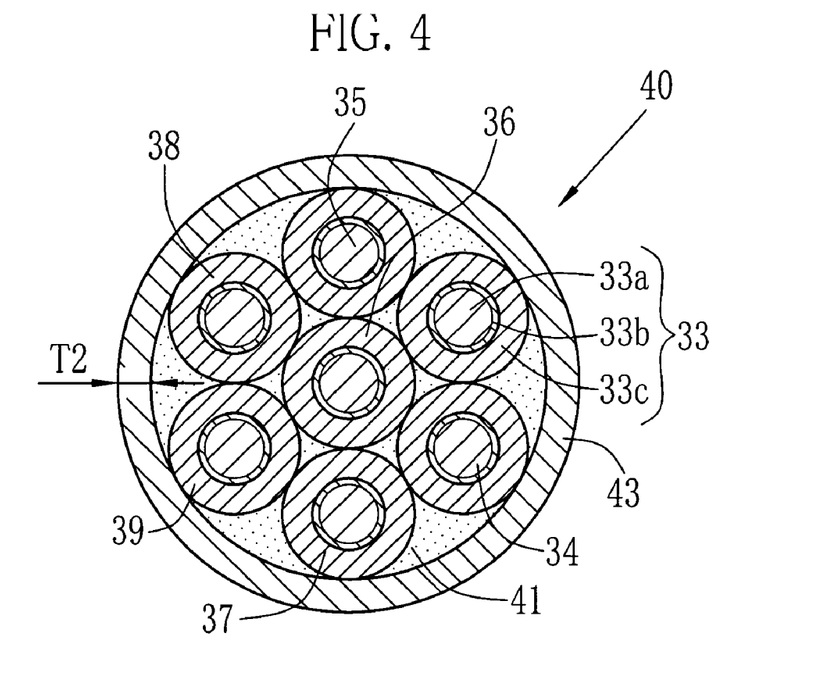
FIG. 4 is a sectional view showing another plastic fiber-optic cable.

FIG. 3 shows a multi-fiber-cable covering machine for producing the multi-fiber optical cable by bundling the single-fiber optical cable of the present invention. FIG. 4 shows a cross section of the multi-fiber optical cable produced by the producing method of this embodiment. Incidentally, the multi-fiber optical cable according to the present invention and the producing method thereof are not restricted to the following description.

Single-fiber optical cables 33 to 37 are conveyed to the multi-fiber-cable covering machine 30 by a conveyor, which is not shown. FIG. 3 shows only five optical cables 33 to 37. In the present embodiment, however, seven optical cables are conveyed to the multi-fiber-cable covering machine 30 to obtain a multi-fiber plastic optical cable 40 in which the seven optical cables are bundled (see FIG. 4).

The multi-fiber-cable covering machine 30 is provided with a filler charging port 31 and a material charging port 32 for forming a second covering layer. It is preferable that a temperature adjuster, which is not shown, is attached to the multi-fiber-cable covering machine 30 for the purpose of improving thermal fluidity of both of a filler 41 and a material for forming the second covering layer 43. The filler 41 is supplied through the filler charging port 31 in a direction shown by an arrow A. The filler 41 is charged between the adjacent optical cables 33–37 to fix arrangement positions of the respective optical cables 33 to 37.

In the present invention, a sort of the filler 41 to be used is not especially restricted. However, it is preferable to possess properties of:

a1) excellent thermoplasticity for easy charging;

a2) good affinity with the first covering layer 20;

a3) plasticity at a low temperature for preventing the core and the clad from being thermally damaged;

a4) low density for lightening the multi-fiber optical cable;

a5) excellent flexibility for lowering the bending loss to be caused when the multi-fiber optical cable is bent; and a6) excellent moisture resistance for compensating deterioration of the moisture resistance caused by thinning the first covering layer 20.

Successively, the material for forming the second covering layer is supplied through the material charging port 32 in a direction shown by an arrow B. The single-fiber optical cables 33 to 37 and the filler 41 are covered and sent out of the cable covering machine 30 as the multi-fiber optical cable 40. After that, processes of cooling and so forth are carried out to obtain the multi-fiber optical cable 40 in which a second covering layer 43 shown in FIG. 4 is formed.

A sort of the material for forming the second covering layer is not especially restricted. However, it is preferable to possess properties of:

b1) good affinity with the first covering layer 20 and the filler 41;

b2) plasticity at a low temperature for preventing the optical fiber from being thermally damaged;

b3) excellent flexibility for lowering the bending loss to be caused when the multi-fiber optical cable is bent;

b4) excellent mechanical strength for protecting the multi fiber from external impact; and b5) excellent moisture resistance for compensating deterioration of the moisture resistance caused by thinning the first covering layer 20.

By the way, the second covering layer 43 may comprise plural layers. In this case, the second covering layer 43 may have a plurality of layers pressingly rolled and having functions described later, as need arises.

Further, the material for forming the second covering layer may include a flame retardant, an ultraviolet-ray absorber, an antioxidant, a radical scavenger, a light-increasing agent, a lubricant and so forth, which may be also included in the material for forming the first covering layer on condition that moisture permeability resistance is satisfied.

Flame resistance of the fiber-optic cable is improved by adding the flame retardant into the covering-layer forming material. It is preferable that the flame retardant is metal oxide, and much preferably is metal hydroxide. Concretely, there are magnesium hydroxide, aluminum hydroxide, calcium hydroxide and so forth.

Some of the flame retardants include a resin containing halogen of bromine etc., additive and phosphorus. From a viewpoint of safety for reducing virulent gas, it is widely carried out to add the metal oxide as the flame retardant. The metal oxide includes moisture being as crystal water, and the included water cannot be perfectly removed in a producing process thereof. For this reason, it is preferable that the flame-resistance covering based on the metal oxide is performed in the second covering layer rather than the first covering layer.

Meanwhile, the first and second covering layers may include materials having various functions in order to grant plural functions. For instance, a barrier layer and a moisture absorbing material may be included in the covering layer or between the covering layers. The barrier layer prevents the optical fiber from absorbing moisture. The moisture absorbing material removes the moisture and is, for example, a moisture absorbing tape or a moisture absorbing gel. Further, a buffer member and a reinforcement layer may be selectively provided in accordance with uses. The buffer member moderates a stress at the time of bending and is a flexible material layer, a foam layer and so forth. The reinforcement layer is for increasing rigidity. It is preferable that the thermoplastic resin includes a fiber (so-called tension fiber) and/or a line material as construction materials besides the resin. This fiber has high elasticity and this line material is a metal wire etc. having high rigidity. It is possible to reinforce a mechanical strength of the obtained fiber-optic cable.

As the tension fiber, there are an aramid fiber, a polyester fiber and a polyamide fiber. As the metal wire, there are a stainless wire, a zinc base alloy wire, a copper wire and so forth. Incidentally, it is possible to attach an exterior of a metallic tube for protection, a support wire for holding, and a member for improving workability in wiring.

Meanwhile, as to the form of the fiber-optic cable, it is possible to select some formations thereof in accordance with its uses. One of the formations is the above collective cable in which the optical fibers are gathered. Another formation is called as a tape-shaped cable in which the optical fibers are aligned. The fiber-optic cable obtained by the present invention may be used in a state of confronted junction. However, it is preferable to surely fix a connect portion by using an optical connector provided at an end portion. As to the connector, it is possible to utilize generally-known connectors of PN-type, SMA-type, SMI-type, F05-type, MU-type, FC-type, SC-type, and so forth.

As described above, the multi-fiber optical cable 40 according to the present invention employs the single-fiber optical cable having the first covering layer 33c whose thickness T1 is less than 500 µm. Thus, it is possible to raise a proportion of the optical fiber relative to the cross section of the multi-fiber optical cable. Incidentally, a lower limit of the thickness T1 of the first covering layer is preferable to be 1 µm or more in order to easily carry out the covering, although the lower limit is not especially defined.

Figure 5:
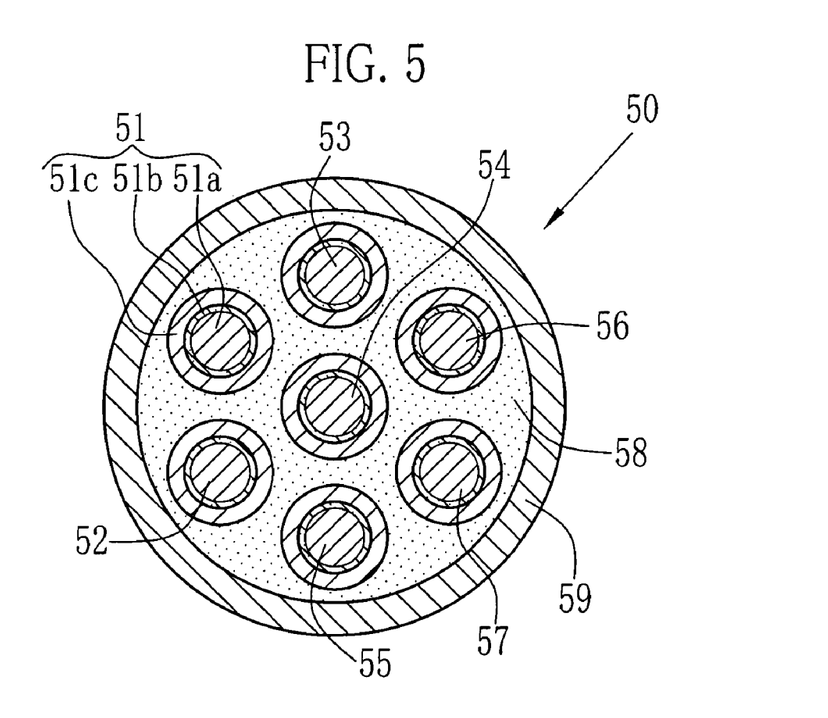
FIG. 5 is a sectional view showing the other embodiment of the plastic fiber-optic cable.

FIG. 5 shows a multi-fiber plastic optical cable 50 of another embodiment. In FIG. 5, single-fiber optical cables 51 to 57 are arranged via a filler 58 so as to prevent the peripheral surfaces thereof from directly contacting with each other. Further, a second covering layer 59 covers the single-fiber optical cables 51 to 57 and the filler 58. In this case, a first covering layer of the single-fiber optical cable is formed for preventing deterioration of mechanical and optical properties to be caused by direct contact of the peripheral surfaces of the single-fiber optical cable. Thus, it is sufficient that a thickness of the first covering layer is 1 µm or more and is less than 500 µm. The optical fiber constituting the single-fiber optical cable of the present invention is excellent in moisture resistance. In virtue of this, moisture resistance of the multi-fiber optical cable is good, although the first covering layer is thin. Moreover, the multi-fiber optical cable is provided with the filler and the second covering layer so that it is possible to improve the moisture resistance by utilizing a material, which has excellent moisture resistance, for the filler and the second covering layer.

In the multi-fiber optical cables shown in FIGS. 4 and 5, the single-fiber optical cables are bundled and the fillers 41 and 58 are contained in the gaps. The single-fiber optical according to the present invention is excellent in the moisture resistance. Further, the single-fiber optical cable is covered with the first covering layer so that the outer surface thereof is prevented from being damaged by contacting the adjacent optical cables with each other. Thus, the filler may be removed from the multi-fiber optical cable. In the case the filler is not contained, a degree of positional freedom of the single-fiber optical cable rises in the multi-fiber optical cable so that it is possible to obtain the optical cable having reduced bending loss and excellent flexibility. Meanwhile, when producing the multi-fiber plastic optical cable having a sea-island structure in which the single-fiber optical cables are bundled with the filler, the second covering layer may not be formed.

Figure 6:
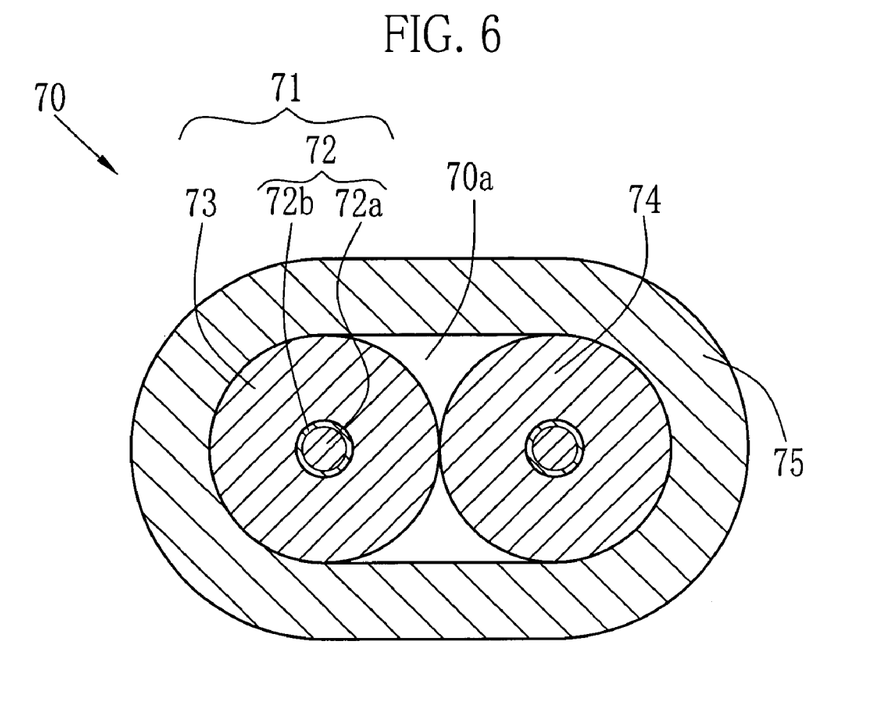
FIG. 6 is a sectional view showing the other embodiment of the plastic fiber-optic cable.

Multi-fiber optical cables 70 and 80 of the other embodiments of the present invention are descried below, referring to FIGS. 6 and 7. In FIG. 6, two single-fiber optical cables are gathered to produce the two-fiber plastic optical cable 70. A single-fiber optical cable 71 is constituted of an optical fiber 72 and a first covering layer 73 covering the optical fiber 72. This optical fiber 72 comprises a core 72a and a clad 72b. Incidentally, a single-fiber optical cable 74 is similarly produced. The multi-fiber optical cable and the producing method thereof according to the present invention are applicable to the two-fiber optical cable. Also in this case, the above-mentioned filler may be contained in or may be removed from a gap 70a between the single-fiber optical cables 71 and 74.

Figure 7:
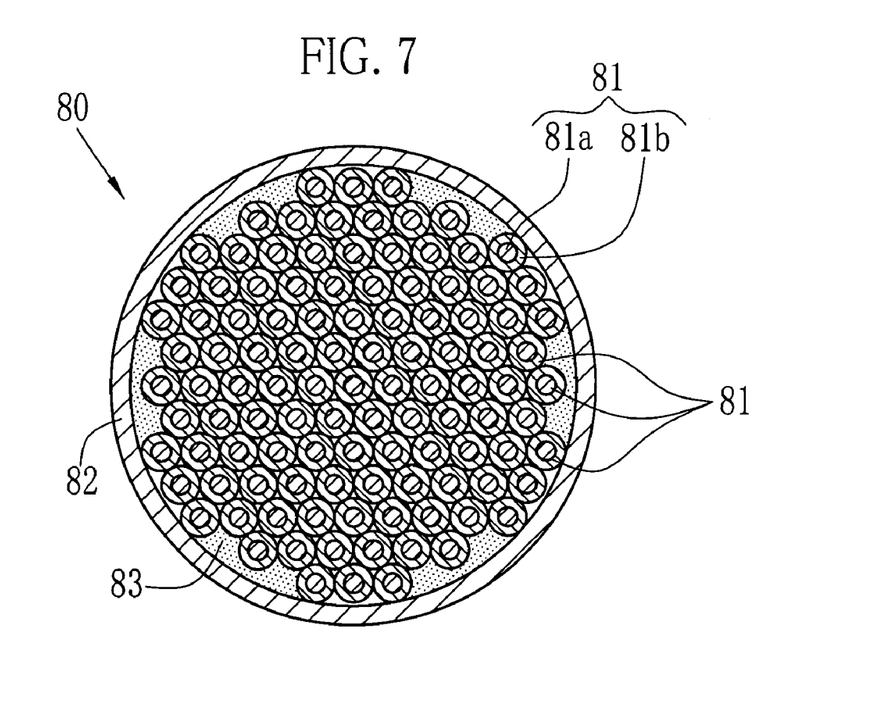
FIG. 7 is a sectional view showing the other embodiment of the plastic fiber-optic cable.

In the multi-fiber optical cable 80 shown in FIG. 7, a large number of single-fiber optical cables 81 are bundled. Incidentally, the single-fiber optical cable 81 is constituted of an optical fiber 81a (comprising a core and a clad which are not shown) and a first covering layer 81b. By forming a covering layer 82 for covering the bundled single-fiber optical cables 81, the multi-fiber optical cable of the present embodiment is obtained. A filler 83 may be contained in or may be removed from gaps between the optical cable 81 and the second covering layer 82 and between the adjacent optical cables 81.

In the present invention, the forms of the single-fiber optical cables are not especially restricted. For example, sizes of the core and the clad, a thickness of the first covering layer, a forming material thereof, etc. are not especially restricted. Further, usage of the filler and the filling method thereof are not restricted to the foregoing. Also, the form of the second covering layer and the covering method thereof are not restricted to the foregoing.

A system for transmitting an optical signal by using the optical cable and the optical fiber being as the optical member of the present invention is constituted of various light-emitting elements, light-receiving elements, other optical fibers, an optical bus, an optical star coupler, an optical signal processor, an optical connector, and so forth. As to a technique regarding these, any of well-known techniques is applicable. For instance, see the following documents. Basis and Practice of Plastic Optical Fiber (issued by N.T.S Co. Ltd.), Nikkei Electronics Vol. 2001.12.3 pp. 110–127 "Optical parts are mounted on a printed circuit board this time", IEICE TRANS. ELECTRON. Vol. E84-C, No. 3, March 2001, pp. 339–344 High-Uniformity Star Coupler Using Diffused Light Transmission, Journal edited by Japan Institute of Electronics Packing Vol. 3, No. 6, 2000 pp.476–480 "Interconnection by Optical Sheet Bus Technique". In addition, the optical buses are described in Japanese Patent Laid-Open Publication (hereinafter called as JP Publication) Nos. 10-123350, 2002-90571, 2001-290055, etc. Optical branching/coupling devices are described in JP Publication Nos. 2001-74971, 2000-329962, 2001-74966, 2001-74968, 2001-318263, 2001-311840, etc. The optical star couplers are described in JP Publication No. 2000-241655etc. Optical signal transmitters and optical data bus systems are described in JP Publication Nos. 2002-62457, 2002-101044, 2001-305395, etc. The optical signal processors are described in JP Publication No. 2002-23011 etc. Optical signal cross-connect systems are described in JP Publication No. 2001-86537 etc. Optical transmission systems are described in JP Publication No. 2002-26815 etc. And, multi-function systems are described in JP Publication Nos. 2001-339554, 2001-339555, etc.

EXAMPLE

The present invention is more concretely described below with examples. Materials, reagents, proportions, operations and so forth described in the following examples may be properly modified unless they deviate from the spirit of the present invention. In other words, the present invention is not restricted to the following examples. Incidentally, Example 1 is described in detail. In Examples 2 through 4 and in Comparative Examples 1 through 3, description of conditions identical with the Example 1 is abbreviated. Meanwhile, Table 1 collectively shows results of experiments carried out in the Examples 1–2 and the Comparative Examples 1–2.

Example 1

Mixed solution of two sorts of monomers (isobornyl methacrylate (IBXMA) and methyl methacrylate (MMA)) was injected, by a predetermined amount, into a cylindrical polymerization container having sufficient rigidity and an inner diameter corresponding to an outer diameter of the objected preform. The diameter of the polymerization container was 22 mm, and a length thereof was 600 mm. The mixed solution had a mass ratio of IBXMA/MMA=¼. In both of the IBXMA and the MMA, moisture was removed so as to be 1000 ppm or less. The dimethyl-2,2'-azobis(2-methylpropionate) was compounded as the polymerization initiator by 0.5 mass % relative to the monomer-mixed solution. The n-lauryl mercaptan was compounded as the chain transfer agent by 0.62 mass % relative to the monomer-mixed solution. The polymerization container containing the monomer-mixed solution was put into hot water of 60° C., and then, prepolymerization was carried out for two hours in a swinging state. After that, the polymerization container was kept in a horizontal state (in that a height direction of the cylinder was horizontally set) at 65° C. In this state, thermal polymerization was carried out for three hours, rotating the polymerization container at 3000 rpm. Successively, a thermal process was carried out for twenty-four hours at 90° C. to obtain the cylindrical tube comprising the foregoing copolymer.

Next, a mixed solution of two sorts of monomers (isobornyl methacrylate (IBXMA) and methyl methacrylate (MMA)), being as raw material of the core, was produced. The mixed solution had a mass ratio of IBXMA/MMA=¼. In both of the IBXMA and the MMA, moisture was removed so as to be 1000 ppm or less. The dibutyl phthalate was mixed as the refractive-index controlling component by 10 mass % relative to the monomer-mixed solution. And then, the mixed solution was filtered with a membrane filter and was directly injected into the hollow portion of the cylindrical tube. The membrane filter had a precision of 0.2 μm and was made from ethylene tetrafluoride. The di-t-butylperoxide was compounded as the polymerization initiator by 0.016 mass % relative to the monomer-mixed solution. The n-lauryl mercaptan was compounded as the chain transfer agent by 0.27 mass % relative to the monomer-mixed solution. The cylindrical tube containing the mixed solution and so forth was inserted into a glass tube having an inner diameter larger than the outer diameter of the cylindrical tube by 9%. In this state, the cylindrical tube was vertically settled in a pressure/polymerization container. After that, the inside of the pressure/polymerization container was replaced with a nitrogen atmosphere and was pressurized up to 0.1 Mpa. Successively, thermal polymerization and thermal process were carried out for twenty-four hours at 120° C. to obtain the preform. The weight-average molecular weight of the preform was 106000, and the molecular weight distribution thereof (weight-average molecular weight/number-average molecular weight) was 2.1.

Bubbles to be caused by volume shrinkage were prevented from occurring in the obtained preform at the time of completion of the polymerization. This preform was drawn in thermal stretching of 230° C. to produce the plastic optical fiber having a diameter of 500 μm. A diameter DA of the core was measured. The measured diameter DA (a mean value of five measurement places) was 497 μm. In the stretching process, occurrence of bubbles was not observed in the preform, and the optical fiber of 300 m was stably obtained. Transmission loss of the obtained optical fiber was measured. The measured value was 160 dB/km at a wavelength of 650 nm and was 1250 dB/km at a wavelength of 850 nm.

The obtained optical fiber was closely wound around a rod having a diameter of 10 mm, by five turns. In this state, an increase value of the transmission loss was measured at the wavelength of 650 nm. The measured value was 0 dB/km.

The first covering layer 20 of polyethylene was formed on the optical fiber at a melting temperature of 130° C. to obtain the single-fiber optical cable 15 (see FIG. 2). The thickness T1 of the first covering layer 20 was 450 μm. An increase value of transmission loss of the single-fiber optical cable was measured just after forming the first covering layer. The measured value was 3 dB/km at the wavelength of 650 nm and was 20 dB/km at the wavelength of 850 nm. Deterioration of the transmission loss was hardly caused by forming the covering layer. Further, the obtained single-fiber cable was wound around a rod in the identical condition with the optical fiber. After a while, the transmission loss was measured at the wavelength of 650 nm. The measured value was 3 dB/km.

Regarding the same material with the first covering layer 20 of the single-fiber cable, a coefficient of dynamic friction was measured by a measurement method based on JIS K 7125. As a measurement result, the coefficient of the dynamic friction was 0.2.

Successively, the single-fiber optical cable was placed for twenty hours in a condition that a temperature was 100° C. and a humidity was 70% or less. After that, transmission loss of the single-fiber cable was measured. The measured transmission loss was 0 dB/km at the wavelength of 650 nm and was 3 dB/km at the wavelength of 850 nm. Optical properties were prevented from deteriorating due to water absorption and so forth.

Example 2

The single-fiber plastic optical cable was produced by a similar method to that of the Example 1, except for the thickness of the covering layer. This thickness was 150 μm in Example 2.

Comparative Examples 1 and 2

Comparative Example 1 was produced by a similar method to that of the Example 1, except that the whole of the IBXMA were replaced with the MMA. Meanwhile, Comparative Example 2 was produced by a similar method to that of the Example 1, except for the thickness of the covering layer. This thickness was 750 μm in the Comparative Example 2.

TABLE 1

| Content of Experiment | Increase of Transmission Loss after Covering | | Increase of Transmission Loss due to Wet Heat | | Bending Loss of Cable |
|---|---|---|---|---|---|
| | 650 nm | 850 nm | 650 nm | 850 nm | |
| Example 1 | 3 | 20 | 0 | 3 | 3 |
| Example 2 | 10 | 50 | 0 | 0 | 2 |
| Comparative Example 1 | 40 | 100 | 40 | 200 | 3 |
| Comparative Example 2 | 0 | 0 | 0 | 0 | 15 |

(In the table, unit of all the measurement results is dB/km.)

From the Table 1, it is understood that the single-fiber optical cable in which increase of bending loss was held down was obtained when the IBXMA having the alicyclic hydrocarbon group was the polymerizable composition of the optical passage. Moreover, it is understood that the bending loss of the cable was further held down in an experiment of the Example 2 wherein the thickness T1 of the first covering layer was 150 μm.

Example 3

In Example 3, the multi-fiber (twin-fiber) plastic optical cable 70 shown in FIG. 6 was produced. The optical fiber 72 having a diameter of 300 μm was obtained in the same condition with the Example 1, except that tension of stretching was changed. Incidentally, at this time, the diameter DA of the core 72a was 295 μm. The single-fiber optical cable 71 was obtained by forming the first covering layer 73 in the same condition with Example 1, except that the thickness T1 of the first covering layer was 450 μm. The single-fiber optical cable 71 was cut in proper length to obtain two single-fiber optical cables 71 and 74. For these optical cables, the material for forming the second covering layer, which had same composition with the first covering layer, was used to form the second covering layer 75 having the thickness T2 of 400 μm. The same items with the Example 1 were examined, and the result thereof was similar to that of the Example 1. It is understood that the bending loss was prevented from occurring in the multi-fiber (twin-fiber) optical cable in which the first covering layer was formed so as to have the thickness of 450 μm.

Example 4 and Comparative Example 3

In Example 4, the multi-fiber plastic optical cable having a diameter of 30 mm was produced. In this optical cable, the optical fiber had a diameter of 300 μm and the thicknesses of the first and second covering layers were respectively 150 μm and 400 μm. Meanwhile, similarly to the Example 3, the multi-fiber plastic optical cable having a diameter of 70 mm was produced as Comparative Example 3 wherein the optical fiber had a diameter of 300 μm and the thicknesses of the first and second covering layers were respectively 750 μm. Heating and humidifying tests in the Example 1 were carried out for these optical cables, and similar results were obtained relative to both thereof. The multi-fiber plastic optical cable obtained in the Comparative Example 3 turned out to have larger bending loss. In contrast, the multi-fiber plastic optical cable according the present invention, which was produced in the Example 4, turned out to hardly cause the bending loss.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A plastic fiber-optic cable comprising:
   a plastic core;
   a plastic clad for surrounding said core; and
   at least one covering layer for covering said clad,
   wherein said core is formed from a material in that a polymerizable composition for an optical member, which includes at least a polymerizable monomer represented by the following formula (1), is polymerized, and a thickness of an innermost covering layer contacting with the clad is less than 500 μm, wherein, $X^1$ denotes one of a hydrogen atom and a deuterium atom, the respective $X^1$s are same or different atoms, $Y^1$ denotes one of H, D, $CH_3$ group, $CD_3$ group, halogen atom and $CF_3$ group, and the $R^1$ denotes a 7–20C alicyclic hydrocarbon group, and
   wherein a difference between transmission losses regarding a wavelength of 850 nm is 80 dB/km or less before and after placement executed under conditions of temperature 100° C., humidity 70% and 20 hours.

2. A plastic fiber-optic cable according to claim 1 wherein said core has refractive-index distribution such that a refractive index reduces from the center of the core toward a periphery thereof.

3. A plastic fiber-optic cable according to claim 1, wherein a raw material for forming said innermost covering layer has a dynamic-friction coefficient of 0.45 or less.

4. A plastic fiber-optic cable according to claim 1, wherein a raw material for forming said innermost covering layer is a thermoplastic polymer.

5. A plastic fiber-optic cable according to claim 4, wherein said thermoplastic polymer is selected from among polyolefin-based polymer, copolymer thereof, and polymer including one of fluorine and chlorine.

6. A plastic fiber-optic cable according to claim 1, wherein a diameter of said core is 600 μm or less.

7. A multi-fiber plastic optical cable comprising:
   a plurality of optical fibers, each of which includes a plastic core, a plastic clad for surrounding said core, and a first covering layer for covering a periphery of said clad; and
   a second covering layer for covering a bundle of said optical fibers,
   wherein said core is formed from a material in that a polymerizable composition for an optical member, which includes at least a polymerizable monomer represented by the following formula (1), is polymerized, and a thickness of said first covering layer is less than 500 μm, wherein, $X^1$ denotes one of a hydrogen atom and a deuterium atom, the respective $X^1$s are same or different atoms, $Y^1$ denotes one of H, D, $CH_3$ group, $CD_3$ group, halogen atom and $CF_3$ group, and the $R^1$ denotes a 7–20C alicyclic hydrocarbon group, and wherein at least one of the $X^1$'s and $Y^1$ includes at least one deuterium atom, and
   wherein a difference between transmission losses regarding a wavelength of 850 nm is 80 dB/km or less before and after placement under conditions of temperature 100° C., humidity 70% and 20 hours.

8. A multi-fiber plastic optical cable according to claim 7, wherein said optical fibers are bundled so as to contact with each other.

9. A multi-fiber plastic optical cable according to claim 7, wherein said optical fibers are bundled so as to be separated from each other.

10. A multi-fiber plastic optical cable according to one of claims 8 and 9, wherein a gap between the optical fibers is infused with a filler.

11. A producing method for a plastic fiber-optic cable having a core and a clad made from plastic, and at least one covering layer for covering said core, said producing method comprising the steps of:
    forming said core from a material in that a polymerizable composition for an optical member, which includes at least a polymerizable monomer represented by the following formula (1), is polymerized; and
    forming an innermost covering layer contacting with the clad such that a thickness thereof is less than 500 μm, wherein, $X^1$ denotes one of a hydrogen atom and a deuterium atom, the respective $X^1$s are same or different atoms, $Y^1$ denotes one of H, D, $CH_3$ group, $CD_3$ group, halogen atom and $CF_3$ group, and the $R^1$ denotes a 7–20C alicyclic hydrocarbon group, and wherein at least one of the $X^1$s and $Y^1$ includes at least one deuterium atom, and
    wherein a difference between transmission losses regarding a wavelength of 850 nm is 80 dB/km or less before and after placement executed under conditions of temperature of 100° C., humidity 70% and 20 hours.

12. A producing method for the plastic fiber-optic cable according to claim 11, further comprising the step of:
    stretching said core after the forming step of said core so as to make a diameter of said core 600 μm or less.

13. A producing method for the plastic fiber-optic cable according to claim 11, further comprising the step of:
    forming said covering layer by using thermoplastic polymer melted by heating.

14. A producing method for a multi-fiber plastic optical cable having an optical fiber, which includes a core and a clad made from plastic, a first covering layer for covering said optical fiber, and a second covering layer for covering a bundle of said optical fibers, said producing method comprising the steps of:

forming said core from a material in that a polymerizable composition for an optical member, which includes at least a polymerizable monomer represented by the following formula (1), is polymerizod;

forming said first covering layer such that a thickness thereof is less than 500 μm; and forming said second covering layer after bundling said optical fibers, (1)

wherein, $X^1$ denotes one of a hydrogen atom and a deuterium atom, the respective $X^1$s are same or different atoms, $Y^1$ denotes one of H, D, $CH_3$ group, $CD_3$ group, halogen atom and $CF_3$ group, and the $R^1$ denotes a 7–20C alicyclic hydrocarbon group, and wherein at least one of the $X^1$s and $Y^1$ includes at least one deuterium atom, and wherein a difference between transmission losses regarding a wavelength of 850 nm is 80 dB/km or less before and after placement executed under conditions of temperature 100° C. humidity 70% and 20 hours.

15. A producing method for the multi-fiber plastic optical cable according to claim 14, further comprising the step of:

stretching said core after the forming step of said core so as to make a diameter of said core 600 μm or less.

16. A producing method for the multi-fiber plastic optical cable according to claim 15, further comprising the step of:

infusing a gap existing between said optical fibers with a filler before forming said second covering layer.

* * * * *